United States Patent [19]

Church

[11] Patent Number: 4,866,246
[45] Date of Patent: Sep. 12, 1989

[54] HIGH RATE DEPOSITION GAS-METAL-ARC WELDING PROCESS

[76] Inventor: John G. Church, 7405 Kimbel, Mississauga, Ontario, 3M6

[21] Appl. No.: 190,309

[22] Filed: May 4, 1988

[51] Int. Cl.$^4$ .............................................. B23K 9/16
[52] U.S. Cl. .................................. 219/137 R; 219/74; 219/136
[58] Field of Search ....................... 219/74, 136, 137 R

[56] References Cited

U.S. PATENT DOCUMENTS

| | | | |
|---|---|---|---|
| 4,187,410 | 2/1980 | Eroshkin et al. | 219/74 |
| 4,463,243 | 7/1984 | Church | 219/74 |

*Primary Examiner*—Clifford C. Shaw
*Attorney, Agent, or Firm*—Harness, Dickey & Pierce

[57] ABSTRACT

A gas-metal-arc welding process, utilizing a four-gas mixture and relatively high voltage, produces a high rate of weld metal deposition. The process involves continuously advancing the end of a meltable, thin wire electrode towards a weld metal deposit surface, while maintaining a predetermined length arc gap therebetween. A flow of shielding gas, which is formed of major proportions of argon and helium and minor proportions of carbon dioxide and oxygen, coaxially surrounds and flows along the electrode end portion and arc gap towards the deposit surface. A relatively high electrical voltage and current density are applied to the electrode. A roughly conically-shaped, hot plasma field is formed within the arc gap between the electrode end and the metal deposit surface. The length of the arc gap and the voltage are adjusted to provide a plasma field base diameter which corresponds to and substantially overlaps the width of the weld bead and the narrow band of the metal deposit surface upon which the weld bead is deposited. Drops melted from the electrode are deposited by globular, free-flight transfer across the arc gap upon the deposit surface substantially within the field base diameter. To form the elongated, narrow weld bead, the electrode, with its concentric arc gap band plasma field, is moved sideways in parallel alignment with the axis of the weld bead. Thus, the process may be used for high deposition rate welding within relatively deep, narrow gaps, as well as upon more exposed metal deposit surfaces.

17 Claims, 1 Drawing Sheet

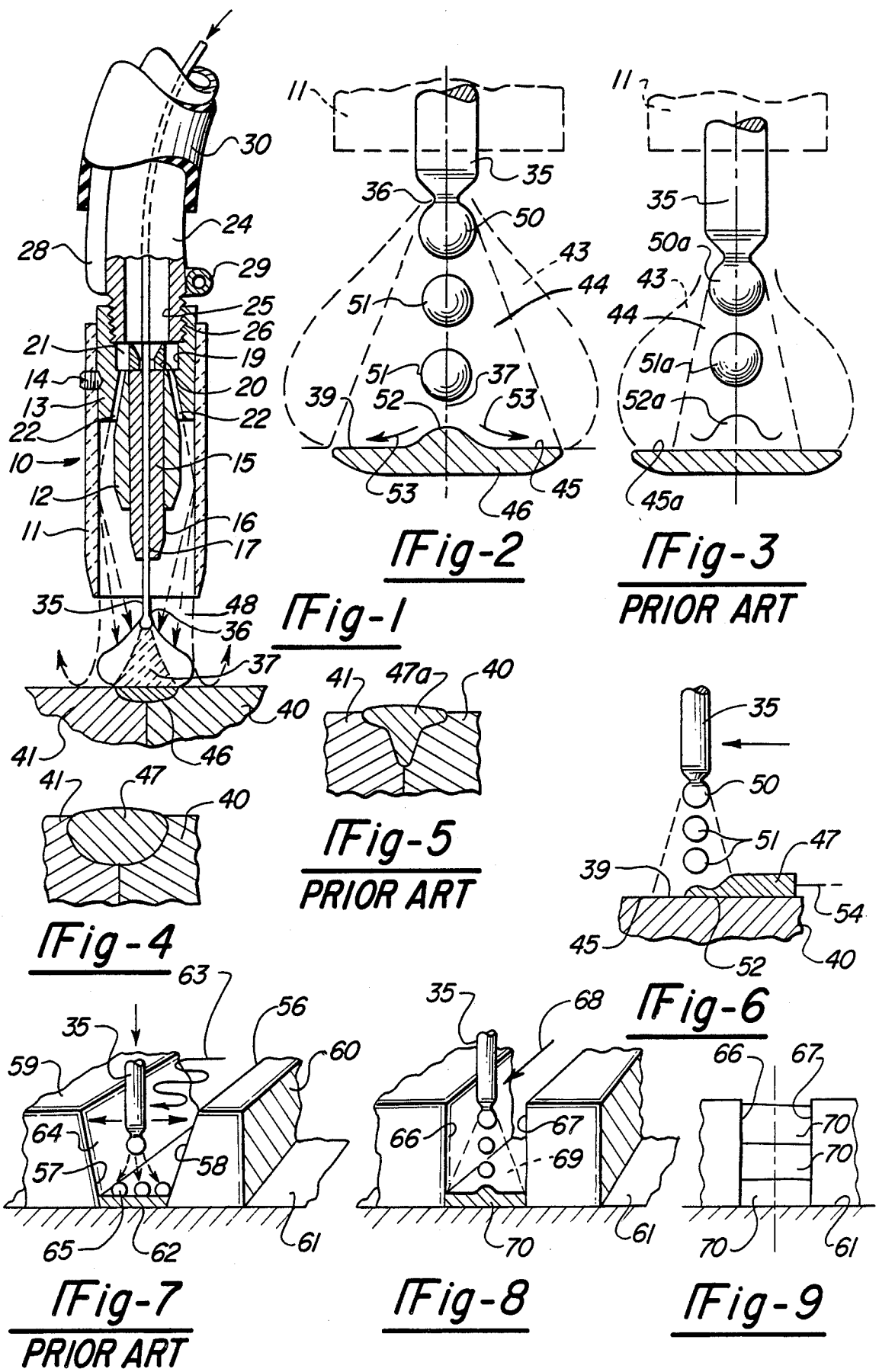

HIGH RATE DEPOSITION GAS-METAL-ARC WELDING PROCESS

BACKGROUND OF THE INVENTION

This invention relates to an improved gas-metal-arc welding process by which a high rate of metal deposition is achieved. The process is of the type which involves continuously feeding a consumable electrode wire towards the weld deposit with a shielding gas flowing around the end of the electrode and the arc gap between the electrode and the weld deposit. The shielding gas comprises a mixture of major proportions of argon and helium and minor proportions of carbon dioxide and oxygen. The electrical arc ionizes the gas to produce a plasma field or cloud in the gap between the free end of the wire electrode and the weld deposit. The plasma field is stabilized relative to the arc gap and electrode axis. Thus, large drops or globules, which are melted from the free end of the electrode, are transferred by free flight across the arc gap to the weld deposit location or substrate surface.

My prior U.S. Pat. No. 4,463,243, issued July 31, 1984, for a "Welding System," describes the underlying process and the four-gas mixture. The process is additionally described in my U.S. Pat. No. 4,572,942, issued Feb. 25, 1986, for a "Gas-Metal-Arc Welding Process."

The process may utilize a welding gun, such as that disclosed in my U.S. Pat. No. 4,464,560, issued Aug. 7, 1984, for an "Arc Welding Gun With Gas Diffuser and External Cooling Conduit," to John G. Church and Emerson G. Malone. Also, a suitable welding gun and this type of process are disclosed in U.S. Pat. No. 4,529,863, issued July 16, 1985, for a "Gas-Metal Arc Welding Method," to Jean-Claude Lebel.

The prior process produces a relatively high rate of deposition of weld material to rapidly form a high-quality weld bead. The rate of metal deposition, the speed of formation of the bead and the quality of the bead all are substantially better than in earlier welding processes.

In order to properly perform the process and secure the desired results of high-speed deposition and high-quality weld beads, it was believed that, along with a relatively high current density, the voltage applied to the electrode had to be held within certain limited ranges. For example, it was believed that when the voltage exceeded certain limits, it would become counterproductive and adversely effect the metal deposition and the quality of the bead.

More recently, I have discovered that, unexpectedly, the rate of metal deposition can be very substantially increased, with good or better quality of the weld bead, by substantially increasing the applied voltage beyond previous limits and by increasing the length of the arc gap. Thus, the invention herein concerns an improvement to the process described in the above-identified prior patents, which substantially increases the speed of depositing weld metal.

SUMMARY OF THE INVENTION

The invention herein relates to substantially increasing the voltage applied to the wire electrode, increasing the arc gap between the end of the electrode and the weld deposit and correlating the voltage and the arc gap to control the position of the base of the conically-generated hot plasma field so that it is concentric with the center line of the weld bead formation. Further, the plasma field base is arranged to transversely, substantially overlap the elongated, band-like substrate surfaces upon which the weld bead is formed.

The foregoing steps are utilized with a four-gas mixture, shielded, gas-metal-arc welding process in which a substantially constant distance arc gap is maintained for globular, free-flight transfer of molten metal drops from the end of the electrode to the weld deposit or pool. The plasma field is stabilized in its concentric relationship to the axis of the arc gap and electrode so that as the electrode is moved sideways along the length of the bead formation, the metal drops move in substantial axial alignment with the arc gap.

The focusing or positioning of the base of the roughly conically-shaped plasma field, in transverse, overlapping relationship with the narrow, bandlike surface upon which the bead is formed, results in the rapid spreading and adherence of the globules upon the surface. This reduces the need to preheat or to clean the substrate or deposit surfaces.

In addition, the weld bead produced by this process, utilizing the increased voltage, has a broader or wider penetration characteristic along its full depth. That is, the bead is very roughly rectangular or oblong in cross-sectional shape below the substrate surface. In comparison, in the prior, lower voltage process, the typical bead narrows considerably along its depth to form, very roughly, a T-shape in cross-section. The T-shaped bead is sensitive to cracking in the area where the stem joins the head of the bead. In contrast, the broader width bead is crack resistant.

The process may be utilized in narrow-gap welding, that is, to weld or fill the gap or space between a pair of adjacent wall-like surfaces. In this case, the electrode is moved sideways, along a line that is parallel to the longitudinal axis of the space or gap. This contrasts with the prior narrow-gap welding procedures which involve moving the electrode in a serpentine path, that is, transversely across the gap while also moving it along the length of the gap. Thus, prior procedures are considerably slower and less effective in filling a narrow gap with weld material.

An important object of this invention is to substantially increase the metal deposition rate of the prior process, as for example by roughly doubling or tripling the amount of metal deposited per unit time, without increasing the amount of labor, expense or materially changing the equipment utilized in performing the prior process. The only necessary equipment modifications relate to the ability to increase the applied voltage and to increase the feed of the electrode wire.

Another object of this invention is to better control the globular, free-flowing transfer of the melted droplets from the electrode end across the arc gap so that the droplets spread out better and adhere better to the weld deposit surface. This may be accomplished by correlating the amount of increase of voltage, the increase in arc distance, and the speed of longitudinal advancement of the electrode, to position the base of a stable, arc-gap concentric plasma field, concentric with the longitudinal axis of the weld deposit or bead. This increases the rate of metal deposition and permits movement of the electrode along a path parallel to, and spaced from, the axis of the weld bead formation. The result is a substantial increase in the speed of formation of a weld bead as compared with the prior process.

Still another object of this invention is permit the weld filling of narrow gaps, such as on the order of between about 1/8 inch to 1 inch wide, which are formed between adjacent, substantially parallel walls of plates or the like. This improved process eliminates the previously required need for beveling or sloping the adjacent walls of deep, narrow gaps prior to welding. That is, the improvements herein permit faster welding of deep, narrow gaps between walls that are substantially parallel, rather than beveled or sloped apart relative to each other. Moreover, the deep gaps or spaces can be filled rapidly with a considerably lesser number of sequential passes along the length of the gap than has been previously required.

Yet another object of this invention is to substantially increase the rate of bead formation, without the need to preheat the weld deposit surface or substrate surface, while maintaining or improving the quality of the weld and the accuracy and penetration characteristics of the bead.

These and other objects and advantages of this invention will become apparent upon reading the following description, of which the drawings form a part.

DESCRIPTION OF DRAWINGS

FIG. 1 is an elevational, cross-sectional view, schematically showing the welding gun and the welding operation.

FIG. 2 is an enlarged, schematic diagram showing the globular free-flow or free-flight transfer of drops within the plasma field.

FIG. 3 is a view similar to FIG. 2, but showing the prior drop deposition and the location of the electrode relative to the improved process schematically diagrammed in FIG. 2.

FIG. 4 is an enlarged cross-sectional view of the weld bead and illustrates the broader width of the bead along its depth of penetration.

FIG. 5 is an enlarged, cross-sectional view of the comparable, weld bead formed with the prior process.

FIG. 6 is a schematic diagram, to a smaller scale, illustrating the movement of the electrode sideways, in parallelism with the central axis of the bead, as the bead is formed.

FIG. 7 is a schematic, perspective illustration of the prior art deep, narrow-gap welding procedure involving sloped walls.

FIG. 8 is a schematic, perspective view showing the welding of a deep, narrow gap utilizing the invention herein.

FIG. 9 is a diagrammatic, schematic end view of a filled deep, narrow gap.

DETAILED DESCRIPTION

FIG. 1 illustrates, in cross-section, a consumable wire, gas-metal-arc welding gun 10 such as of the type disclosed in my above-mentioned U.S. Pat. No. 4,464,560. The gun includes an external tubular nozzle or sleeve 11 which may be formed of a suitable ceramic material or a ceramic-like material.

A cylindrically-shaped diffuser member 12 is arranged, coaxially, within the sleeve 11. The diffuser member is formed with an enlarged upper end or head portion 13 which closely fits within the sleeve. The head portion and sleeve may be immovably held together, such as by a set screw 14. A central bore 15, in the diffuser, receives an elongated, tubular tip member 16 having a central opening 17.

The upper end or head 13 of the diffuser is provided with an enlarged bore 19 into which a ring-like spacer 20 is fitted. The spacer is provided with radially outwardly extending fins 21, with spaces between the fins. Angled passages 22 formed through the head of the diffuser member communicate at one end with the spaces between the fins and at their opposite ends with the annular space between the diffuser and sleeve.

A conventional copper tube 24 having a threaded end portion 25 is threadedly engaged within a threaded socket 26 formed in the diffuser head portion 13. The tube carries electricity and also carries the gas mixture which flows through the spaces between the spacer fins 21 and through the angled passages 22.

A cold water carrying coolant tube 28 is secured to the external surface of the copper tube 24. The coolant tube may be provided with one or more wrap-around loops 29 for cooling the copper tube at the area where it joins to the diffuser. This cools the welding gun to the extent required.

One or more sleeves 30 are positioned around the coolant tubes and copper tube in order to permit handling of the tubes and the gun by a welder. This is a conventional construction.

An elongated, thin-wire electrode 35 passes through the center of the copper tube 24 and through the central opening in the ring-like spacer. The wire continues through the central opening 17 in the diffuser to a point where its lower end 36 extends beyond the end of the tubular sleeve 11.

The thin-wire electrode 35 is fed longitudinally through the gun at speeds set by the welder. The mechanism for advancing the wire electrode is conventional and commercially available. Therefore, it is not described here. While the wire electrode may vary in composition and diameter, an example of such an electrode is a wire of a diameter of between about 0.016 to 0.062 inches. The diameters may be slightly smaller or slightly larger, with preferable diameters being roughly around 0.035 to 0.045 inches. The mechanism for feeding the wire longitudinally should be of a type which is capable of feeding the wire at a speed of up to roughly 2000 inches per minutes, which is about three times the speed of the wire feed in a typical prior operation, such as disclosed in my above-identified patents. Conventional feed mechanisms which can be sped up to this desired speed are commercially available.

An arc gap or space 37, of a predetermined length, is maintained between the lower or outer end 36 of the electrode and the metal weld deposit surface or substrate 39. The deposit surface or substrate, for purposes of illustration, are shown as appearing upon a pair of plates 40 and 41, which are arranged in abutting relationship for welding them together (see FIG. 1). However, the shape and arrangement of the deposit surface may be varied, as for examples, a right angle corner, etc.

When electrical current is passed through the electrode at a sufficiently high amperage, as for example, on the order of between about 500-700 amps, a plasma field 43 is formed from the ionized gas mixture. An intensely heated, inner plasma field zone 44, shown in dotted lines as a roughly conically-shaped area, is illustrated in FIGS. 2 and 3. The base 45 of the cone is positioned upon the weld deposit surface or substrate. The base is located to substantially span the width of the weld pool 46, that is, the transverse width of the bead 47. This contrasts with the prior art process, as illustrated in FIG. 3, for example, wherein the cone is more focused, and with the electrode end being more closely spaced to the weld deposit, so that the cone base 45a covers less than the width of the pool.

The weld bead 47 is characteristically broader in width for its full depth (see FIG. 4) then the bead 47a produced by the prior process. (see FIG. 5). That is, the prior process bead 47a is characteristically roughly T-shaped in cross-section as compared with the very roughly rectangular cross-sectional shape of the bead 47. The T-shaped bead is more prone to cracking, particularly where its stem joins its head.

The flow of gas, through the tube 24, passes through the angled passages 22 in the diffuser and is guided by the interior wall surface of the nozzle 11 towards the weld deposit or weld pool 46. As indicated by the dotted line arrows 48 in FIG. 1, at least some of the gas flow is focused towards the intersection of the axis of the arc gap and the weld deposit surface. Thus, the gas flow helps to centralize the plasma field relative to the arc gap.

As shown in FIG. 2, globules or relatively large drops 50 form, by melting, upon the free end 36 of the electrode. As each drop releases from the end of the electrode, it free-falls or free-flight traverses the arc gap, as illustrated by the representative drops 51. As each drop lands upon the weld pool, it flattens, as illustrated by the flattening drop 52, and spreads out, as indicated by the arrows 53, to the width of the pool. As can be seen, the electrode, the arc gap, the plasma field and the pool are all concentric. Thus, the drops travel along the central axis of the pool or bead, landing in the middle thereof and rapidly spreading sideways, as well as forwardly and rearwardly. This spreading action results in an efficient, smooth distribution of the molten metal, without splattering. By way of contrast, as shown in FIG. 3, in the prior process the forming drop 50a releases into a free-travelling globule 51a which, as illustrated by drop 52a, lands and tends to splatter and to be more centralized in its absorption by the pool. With this improved process, the size of the drops or globules is increased. Moreover, the number of drops per unit time is increased, as schematically shown in FIG. 2.

As diagrammatically illustrated in FIG. 2, the arc gap is maintained at a greater length, correlated to the greater voltage and the positioning of the wider plasma base 45, as compared with the prior art process as schematically illustrated in FIG. 3. Also, as shown in FIG. 6, as the electrode is moved sideways, that is, centralized upon, parallel to, and in the direction of the longitudinal axis 54 of the bead 47, the plasma field base heats the substrate surface upon which the drops fall. Thus, preheating is unnecessary and, because of the intense, momentary heating of the pool surface or substrate, the drop spreads out evenly and adheres better.

NARROW GAP WELDING

The process lends itself to welding narrow gaps, that is, to filling a narrow space formed between a pair of adjacent, spaced apart walls which may be the edges of thick plates. Welding such narrow gaps, and particularly filling the gaps, is a relatively slow and difficult procedure. By way of example, referring to FIG. 7 which illustrates the prior art process, a narrow gap 56 is formed between adjacent, spaced apart, sloped or beveled walls 57 and 58 which are formed on the edges of relatively thick plates 59 and 60. The objective is to weld the two plates together, that is, to fill the narrow gap with weld material.

The plates may be placed upon a support plate 61, or a suitable support surface, which blocks the gap. Then, a bead 62, which forms a layer of weld material, is laid down between the walls. To do this, the electrode 35 is moved in a serpentine path, as illustrated by the arrow 63, so that it moves back and forth (see arrows 64) transversely of the gap as well as longitudinally of the gap. Hence, globules 65 are transferred into the gap, similarly to spreading seed in planting grain. When the layer 62 is complete, the process is repeated to place another layer upon the first layer. By repeated movement of the electrode along the length of the gap, sufficient layers are built up to fill the gap and weld the plates together. This sort of welding typically is performed within a gap of roughly one-eighth to one-inch width and may take a considerable number of layers, depending upon the plate thickness.

In the present process, the need to bevel or oppositely slope the adjacent walls is eliminated. Thus, the walls or plate edges 66 and 67 may be substantially parallel. This eliminates the prior need for cutting or trimming the plates to form the sloped edges. Here, the electrode 35 is moved longitudinally of the gap, as illustrated by the arrow 68 in FIG. 8, and is centered on the central axis of the weld bead. The plasma cone 69 is so formed, by adjusting the voltage and length of the arc gap, so that its base substantially covers the width of the gap. Thus, the globular, free-flight transfer of the drops from the electrode results in the drops landing substantially at the center axis of the weld pool or deposit and spreading laterally to form a layer 70. The movement of the electrode along the length of the gap may be repeated to form a succession of layers 70, one upon another, as shown in FIG. 9. However, the number of layers required, as compared to the operation shown in FIG. 5, may be less than half. For example, seven or eight layers may be required in the process shown in FIG. 6, whereas about three layers may be needed in the operation shown in FIG. 7. Significantly, the straightline movement of the electrode, parallel to and spaced from the center axis of the layer or bead, considerably speeds up the formation of the layer. For example, it may be possible to deposit three times the amount of metal at two or three times the number of inches of bead per minute, as compared with the prior process.

OPERATION

The improved process, similarly to the prior patented process, is operated with a four-gas mixture comprising major proportions of argon and helium and minor proportions of carbon dioxide and oxygen. For example, for welding mild and low-alloy steel, which is a common material requiring welding, a preferred mixture comprises about 65% argon, about 26.5% helium, about 8% carbon dioxide, and about 0.5% oxygen. However, the gas mixture may vary somewhat in proportion, depending upon the particular materials being welded and the weld wire materials. Thus, it is contemplated that the gas mixture be between about 40–70% argon; between about 25–60% helium; between 3–10% carbon dioxide; and between about 0.1 to 2% oxygen.

For optimum results, it is desired that the electrical current be at a sufficiently high rate so that the current density is high. For example, utilizing an electrode wire that is 0.032 inches in diameter, identified as AWS A5.18, classification E 70S6, for welding a mild steel, the amperage should be high enough to give approximately 700,000 amps per square inch, or roughly 550 amps. This may be utilized with a voltage in the vicinity of about 50 up to 52 volts. Preferably, the current density should be in excess of 500,000 amps per square inch and more desirably in the range of roughly 700,000 amps per square inch or more.

The voltage may be varied, but in a range higher than prior ranges. Preferably, the voltage should be around 50 volts and, in any event, is preferably in the range of between about in excess of 42 volts through about 52 volts.

As an example of the comparison of the results obtained here, utilizing an electrode wire of a diameter of 0.045 inches, with a shielding gas comprising 26.5% helium, 65% argon, 8% carbon dioxide and 0.5% oxygen:

As can be seen, the improved process is capable of much higher metal deposit speeds, as well as linear welding speeds, than the prior process utilizing conventional wire-feeding systems and power sources. Moreover, unexpected physical properties are obtained, particularly in welding alloy materials. That is, in the past, it was necessary to preheat the substrate when made of an alloy containing chromium, magensium, nickel and other alloy elements before a weld could be made with a crack-free deposit. With the improved process, the increased conductivity produced by the gas and the plasma control produces sounds welds in the alloy material without preheating.

As an example, in the case of a deep, narrow-gap weld, utilizing plates of the same thickness with the same gap between them, except comparing the parallel walls of the improved process with the beveled walls of the prior process, it took about 0.75 inches per minute to fill the prior narrow gap and about 5 inches per minute to fill the improved gap weld. With the improved process, about 2000 inches per minute to wire was fed, at about 50 volts, compared with about 700 inches per minute of wire fed at about 20 volts with the prior process.

The correlation required between the increased voltage and the increased arc gaps for positioning the base of the plasma for spanning the bead width is variable and within the judgment of the welder. For example, starting with roughly a one-half inch arc gap, an experienced welder, with a short period of trial and error, will work out the optimum arc gap, voltage and amperage parameters for producing the best results for the particular materials that are being welded. The result is that the same skilled welder can produce roughly two to three times more weld than he could produce earlier.

This invention may be further developed within the scope of the following claims. Accordingly, having fully described an operative embodiment of this invention, I now claim:

I claim:

1. In a gas-metal-arc welding processing, including the steps of continuously, longitudinally advancing a consumable, thin wire electrode towards a weld metal deposit location while maintaining an arc gap formed between the end of the electrode and the weld metal deposit location; simultaneously applying an electrical voltage and current to the electrode to provide an arc across the arc gap; and continuously flowing a gas, which is formed of a mixture of major proportions of argon and helium and minor proportions of carbon dioxide and oxygen, around the end portion of the electrode and the arc gap towards the deposit location, including centering the flowing gas on the axis of the arc gap and electrode end and directing at least a portion of the flowing gas towards the intersection of the axis of the arc gap and the weld deposit location; and providing a roughly conically-shaped, hot plasma field within the arc gap and centered on the axis of the arc gap; and maintaining a globular, free-flight transfer of molten metal from the electrode end to the weld metal deposit location; the improvement for producing a high rate of deposition of weld metal from the electrode upon the weld metal deposit location comprising the steps of:

(a) subtantially increasing the electrical voltage applied to the electrode to above 42 volts;

(b) applying a relatively high amperage to the electrode to produce a high-current density through the electrode;

(c) and advancing the wire electrode at a speed correlated to the higher rate of melting of globules therefrom;

(d) and moving the electrode end generally sideways, parallel to and substantially uniformly spaced from the surface forming the weld deposit location at a speed correlated to the rate of weld material deposition.

2. In a gas-metal-arc welding process as defined in claim 1, and including applying the electrical voltage in a range of between about more than 42 volts to roughly about 52 volts.

3. In a gas-metal-arc welding process as defined in claim 2, and including applying a current amperage to the electrode which is over roughly 500 amps to maintain a high-current density through the electrode which is roughly over 500,000 amps per square inch of electrode cross-sectional area.

4. In a gas-metal-arc welding process as defined in claim 3, and including maintaining a high-current density through the electrode which is roughly in the area of about 700,000 amps or more, per square inch of electrode cross-sectional area.

5. In a gas-metal-arc welding process as defined in claim 4, and including providing a fine electrode wire on the order of between about 0.032 or less to about 0.062 inches in diameter.

6. In a gas-metal-arc welding process as defined in claim 2, and including increasing the length of the arc gap from beyond a length usable with a lower applied voltage to a greater length correlated to the higher applied voltage.

7. In a gas-metal-arc welding process as defined in claim 1, and including correlating the voltage and the length of the arc gap to cause the diameter of the base of the plasma field to substantially correspond to the width of the weld bead and to overlap the transverse width of the narrow, band-like surface portion defining the weld deposition location upon which the weld bead is deposited, and including moving the electrode along the length of, and centered along, the central axis of the band-like deposition location.

8. In a gas-metal-arc welding process as defined in claim 7, and including providing an elongated, narrow, band-like deposition location, upon which the weld bead is deposited, between adjacent, spaced apart, generally parallel walls which form a narrow gap therebetween, for depositing metal between the walls for welding the walls together.

9. In a gas-metal-arc welding process as defined in claim 8, and including successively repeating the movement of the electrode along the length of and centered upon the central axis of the band-like deposition location for depositing successive layers, one upon another, of weld material thereon to fill the narrow gap to the depth desired.

10. A gas-metal-arc welding process for a high rate of deposition of weld metal upon a metal deposit surface, comprising the steps of:
   (a) continuously advancing a consumable, thin-wire electrode towards a metal deposit surface while maintaining a substantially uniform length arc gap between the end of the electrode and the surface;
   (b) applying a relatively high electrical voltage to the electrode, such as on the order of between about more than 42 volts to about 52 volts or more;
   (c) applying a relatively high electrical amperage to the electrode sufficient to provide a high-current density, that is, in excess of about 450,000 amps per square inch of electrode cross-sectional area;
   (d) continuously flowing a gas mixture, formed of major proportions of argon and helium and minor proportions of carbon dioxide and oxygen, along, and coaxial with, the end portion of the electrode and the arc gap towards the metal deposit surface;
   (e) forming a roughly conically-shaped, hot plasma field within, and coaxial with, the air gap, with the base of the conically-shaped field located upon the metal deposit surface;
   (f) maintaining a substantially globular, free-flight transfer of molten metal drops from the electrode end to the metal deposit surface;
   (g) advancing the electrode in an axially longitudinal direction at a speed correlated to the rate of melting of drops from the end thereof to maintain the length of the arc gap substantially constant;
   (h) and moving the electrode sideways at a rate correlated to the rate of melting of the electrode so that its end remains substantially parallel and uniformly spaced from the metal deposit surface.

11. A gas-metal-arc welding process as defined in claim 10, and including applying sufficient electrical current to the electrode to produce a current density in the range of roughly between about 500,000 to over 700,000 amps per square inch of electrode cross-sectional area.

12. A gas-metal-arc welding process as defined in claim 10, and including said gas mixture comprising essentially between about 40-70% argon, between about 25-60% helium, between about 3-10% carbon dioxide, and between about 0.1-2% oxygen.

13. A gas-metal-arc welding process as defined in claim 10, and including directing at least a portion of the flowing gas towards the intersection of the axis of the air gap and the metal deposit surface.

14. A gas-metal-arc welding process as defined in claim 10, and including correlating the voltage and the length of the arc gap to cause the diameter of the base of the plasma field to substantially correspond to the width of the weld bead and to overlap the transverse width of the narrow, elongated, band-like weld deposition location upon which the bead is deposited, and moving the electrode along the length of, and centered along, the central axis of the band-like deposition location.

15. A gas-metal-arc welding process as defined in claim 14, and including successively repeating the movement of the electrode, in centered alignment, along the central axis of the band-like deposition location for depositing successive layers of weld material thereon.

16. A gas-metal-arc welding process as defined in claim 15, and including providing the elongated, narrow, band-like deposition location between adjacent, spaced apart, but generally parallel walls, which form a narrow gap, for welding the walls together.

17. A gas-metal-arc welding process for high-speed, high deposition rate welding of elongated, narrow gaps located between adjacent, spaced apart, but generally parallel walls, comprising essentially of steps of:
   (a) continuously advancing a consumable, thin-wire electrode towards a narrow, elongated, band-like metal deposit surface formed by the gap, while maintaining a substantially uniform length arc gap between the end of the electrode and said surface;
   (b) applying a relatively high electrical voltage to the electrode;
   (c) applying a relatively high electrical current to the electrode sufficient to produce a high-current density within the electrode;
   (d) continuously flowing a gas mixture, formed of major proportions of argon and helium and minor proportions of carbon dioxide and oxygen, along and coaxial with the end portion of the electrode and the arc gap in a directions towards the metal deposit surface;
   (e) forming a roughly conically-shaped, hot plasma field within, and coaxially arranged relative to, the arc gap and the surface between the walls defining the narrow gap, with the base of the conically-shaped field arranged upon the metal deposit surface and spanning substantially the full width of the surface;
   (f) maintaining a substantially globular, free-flight transfer of molten metal from the electrode end to the metal deposit surface;
   (g) advancing the electrode towards the deposit surface at a speed correlated to the rate of melting of metal from the end thereof to maintain the constant length of the arc gap;
   (h) moving the electrode sideways in parallel alignment of the central axis of the bead and the gap surface upon which the weld metal is deposited at a rate correlated to the rate of melting, including the narrow gap being deeper than the height of the weld bead deposited within the gap;
   (i) successively repeating the movement of the electrode along and parallel to the central axis of the band-like deposition surface located within the narrow gap for successively depositing layers of weld metal thereon for filling the narrow gap to the desired depth with controlled penetration; and
   (j) applying the electrical voltage to the electrode in the range of between about more than 42 volts to about 52 volts or more, and correlating the voltage and the arc gap to form the diameter of the base of the plasma field, roughly equal to the width of the narrow gap at the weld deposit surface therein.

* * * * *

UNITED STATES PATENT AND TRADEMARK OFFICE
CERTIFICATE OF CORRECTION

PATENT NO. : 4,866,246

DATED : Sep. 12, 1989

INVENTOR(S) : JOHN G. CHURCH

It is certified that error appears in the above-identified patent and that said Letters Patent is hereby corrected as shown below:

Column 7, line 17, insert the following chart:

|  | Prior Process | Improved Process Example A | Improved Process Example B |
|---|---|---|---|
| Wire Feed Speed | 630 inches/minute | 1500 inches/minute | 2000 inches/minute |
| Melt-Off Rate | 22 lbs./hr. | 40 lbs./hr. | 54 lbs./hr. |
| Current | 400 amps | 650 amps | 800 amps |
| Voltage | 37.5 volts | 45 volts | 51 volts |
| Welding Speed | 6 inches/minute | 14 inches/minute | 22 inches |

Signed and Sealed this

Nineteenth Day of February, 1991

*Attest:*

HARRY F. MANBECK, JR.

*Attesting Officer*      *Commissioner of Patents and Trademarks*